April 23, 1963 K. SANER 3,086,747
RELEASABLE COUPLING WITH LATCHED VALVE
Filed March 19, 1962
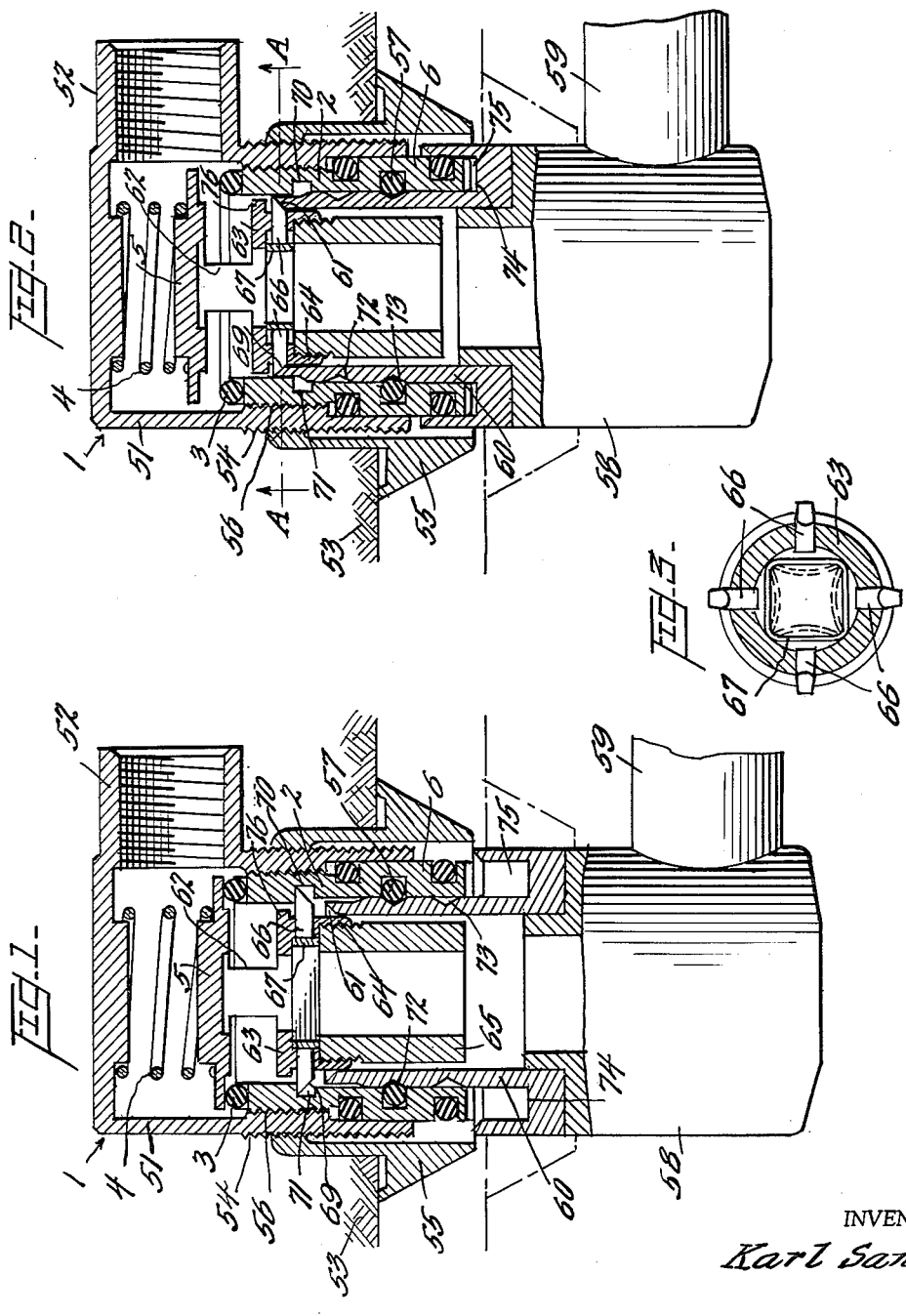
INVENTOR
*Karl Saner,*
BY *Watson, Cole, Grindle + Watson*
ATTORNEYS

United States Patent Office 3,086,747
Patented Apr. 23, 1963

3,086,747
RELEASABLE COUPLING WITH LATCHED VALVE
Karl Sauer, Ensisheimerstrasse 15, Basel, Switzerland
Filed Mar. 19, 1962, Ser. No. 180,478
Claims priority, application Switzerland Apr. 5, 1961
7 Claims. (Cl. 251—89.5)

This invention relates to releasable pipe couplings.

Pipe couplings are known which have first and second coupling members adapted to be pushed coaxially one within the other for coupling purposes and a shut-off valve on the first coupling member, the closure member of which is controllable by the second coupling member and is pressed non-positively against the valve seating and secured against opening by locking means which, when the coupling is engaged, are releasable by means of a movement of the second coupling member relatively to the first coupling member.

However, in the known couplings of this kind the closure member can be unlocked from the exterior without the use of the second coupling member. Thus, a coupling of this kind is insufficiently secured in the uncoupled state. In particular in the case of gas connections in dwellings, a very considerable degree of safety against unauthorised opening of the valve is required.

According to the invention there is provided a releasable coupilng comprising first and second coupling members adapted to be pushed one within the other in an axial direction for coupling purposes and a shut off valve disposed in the first coupling member, the closure member of which is controllable by the second coupling member and is resiliently pressed against the valve seating and prevented from being lifted off the seating by a plurality of locking means, each of which is resiliently retained in its locking position independently of the others release of the locking means being achieved directly by the second coupling member during the coupling operation. In consequence of this arrangement, unauthorised unlocking of the closure member by external means is made impossible, even if the unauthorised person should succeed in releasing an individual locking means.

Preferably the first coupling member is provided with a housing to which is rigidly attached a guide sleeve for guiding a projecting central tube member on the second coupling member when coupling takes place, the locking means being mounted in a forwardly projecting member constrained to move with the valve closure member, the locking means engaging a shoulder on the guide sleeve in their locking position under the action of a spring, the arrangement being such that the locking means extend into the path of the projecting central tube, inward movement of this tube causing displacement of the locking means out of engagement with the shoulder on the guide sleeve, further inward movement of the tube causing lifting of the valve closure member from the valve seating. Due to this arrangement either one of the coupling members can be accommodated within a relatively small space, in the same way as will an electrical wall socket and similarly under plaster. In the same way, the other coupling member is constructed as simply as an electrical plug and furthermore the coupling and uncoupling can be effected by simple axial displacement of this coupling member in any desired rotational position, so that the couplings can be manipulated without requiring any kind of thought or manual skill.

In the accompanying drawings:

FIGURE 1 shows a central longitudinal section of a coupling in accordance with the invention with the first coupling member in a position just prior to achieving its fully coupled position.

FIGURE 2 is a view similar to FIGURE 1 but shows the coupling in the fully coupled position, and FIGURE 3 shows a cross-section taken along the line A—A of FIGURE 2.

The first coupling member of female coupling member 1 of the gas connection shown is disposed in a limb 51 of a housing having the shape of a pipe elbow, the other limb 52 of which is designed as a connecting piece for the gas supply pipe. Both the limbs are substantially covered by plaster, shown in this case as a surface 53. At its free end portion, the limb 51 has an external screwthread 54 upon which is screwed a rosette 55. The limb 51 has furthermore an internal screwthread 56 into which a correspondingly externally screwthreaded guide sleeve 2 is screwed. This guide sleeve 2 is provided with a valve seating 3 at its inner end. Disposed on the latter, bearing nonpositively against it, is the closure member 5 of the valve formed as a valve disc which is subjected to the influence of a helical compression spring 4 bearing at its other end on the inner side of the angle limb 52. The opposite end portion of the guide sleeve 2 is formed as a connecting piece 6 having on its inner side an annular groove with packing ring 57 of a resilient material, such as rubber inserted therein. On the inner side, the packing ring projects beyond the wall of the sleeve 2.

The second coupling member male coupling member 58 is connected to a gas delivery tubing 59 and has at its other end a projecting central tube member 60, the free end portion 61 of which has an outwardly diverging conical surface. On the gas delivery side on the valve disc 5 is provided a central, sleeve-like projection 62 formed with at least one aperture (not shown) and carrying at its other end a ring 63. The ring 63 extends coaxially with respect to the guide sleeve 2 and is formed on the delivery side with an internally screwthreaded projection 64 into which is screwed a prolongation sleeve 65 which also extends coaxially with respect to the guide sleeve 2.

The ring 63 is formed with four radially, non-circular apertures arranged with equal peripheral spacing and in each of which a locking means 66 is guided for longitudinal displacement. According to FIGURE 3, the ring 63 surrounds a spring 67 consisting of a closed leaf spring band forming a square as shown. The arrangement in the ring 63 is such that the four sides of the spring 67 each co-operate with the inner end of one of the locking means 66. The spring 67 tends to press each locking means 66 outwardly with the same force. The outer end of the locking means 66 is inwardly bevelled in the gas delivery direction in such manner that the oblique surface 69 of the locking means is arranged parallel with respect to the conical surface of the portion 61 of the tube member 60 when the tube member 60 is in a coaxial position relatively to the guide sleeve 2.

The outer end portions of the locking means 66 bear, in the extended locking position illustrated in FIGURE 1, against an annular shoulder 70 formed by the corresponding side of an annular groove 71 arranged on the inner side of the guide sleeve 2. In the locking position, the oblique surfaces 69 of the locking means extend into the path of movement of the portion 61 of the tube 60 when the latter is in the position illustrated in FIGURE 1 in which its outer side is guided in such manner as to be rotatable and axially displaceable as a sliding fit on the inner side of the guide sleeve 2. Two annular grooves 72 and 73 are provided on tube 60 and are arranged in such manner that they co-operate alternately and in the manner of a snap locking means with the packing ring 57 of the sleeve 2 and, in the snappedin position secure the male coupling member 58 against axial displacement.

In the inoperative position of the movable parts illustrated in FIGURE 1, the valve is closed. The central tube member 60 is out of engagement with the locking means 66, its annular groove 72 being in locking engagement with the packing ring 57. In this position, the coupling member 58 is retained sufficiently to ensure that it will not be able to drop accidentally out of the other coupling member 1 but can be drawn out if a sufficient pull is exerted to overcome the snap closure means 57, 72. If it is desired to establish the gas connection, the coupling member 58 is pushed completely into the coupling member 1 until the base 74 of a groove 75 formed in it abuts, as shown in FIGURE 14, against the free end of the guide sleeve 2. The tube member 60 also moves inwardly, the conical surface of the portion 61 engaging and acting upon the oblique surface 69 of the locking means. Consequently, the locking means 66 are completely pushed in and are displaced out of engagement with the shoulder 70 on the sleeve 2. The tube member 60 slides past the outer bounding edge of the oblique surface 69 and as it does so its inner side retains the locking means 66 in the unlocked position. During further movement, this edge engages an outwardly projecting flange-like edge portion 76 of the ring 63 by means of which the ring 63 is guided for axial displacement in the sleeve 2. Thereby, the ring 63 is pushed inwardly by the tube member 60 and the valve disc 5 is lifted off its seating 3 into the completely open position illustrated in FIGURE 2. As this is done, the packing ring 57 snaps into the annular groove 73, whereby the coupling member 58 is retained in the open position. The gas is able to flow through the limb 52 and the aperture formed in the sleeve 62 and also through the ring 63 and the sleeve 65 into the coupling member 58 and from there, via the connecting tubing 59, to the point of consumption.

If the gas admission is to be temporarily interrupted, the coupling member 58 is drawn out of the coupling member 1 to such an extent that the annular groove 73 is disengaged from the packing ring 57 and the groove 72 is engaged by the packing ring 57, thus again establishing the "coupling ready" position shown in FIGURE 1. If the gas connection is to be connected to a further second coupling member, the coupling member 58 is completely drawn out.

During the drawing-out of the coupling member 58 from the valve open position illustrated in FIGURE 2, the closure disc 5 follows the tube member 60, under the influence of the spring 4, until it bears against seating 3. On further movement of the coupling member 58, the portion 61 of the tube member 60 frees the locking means 66, the latter engage behind the shoulder 70 under the influence of the spring 67 and thereby secure the valve disc 5 against movement out of the closure position. Thus, if the coupling member 58 is completely drawn out of the coupling member 1, the valve cannot be opened from the exterior by any kind of manipulation.

It would per se suffice to provide a single locking means 66 which could be subjected to the influence of any desired closure spring arranged on the ring 63. However, by providing a plurality of locking means, it becomes first of all possible to secure the valve disc on a plurality of sides, for example against slight tilting positions, and, furthermore, the safety of the valve closure is substantially increased, since it is not possible, by using auxiliary means such as screw drivers or the like, simultaneously to push more than one locking means out of its locking position.

It is clear that this adjustability can also be achieved by means of the screwing arrangement between the housing 1 and the sleeve 2.

What I claim is:

1. A releasable coupling comprising a first coupling member, a second coupling member adapted to be pushed within the first coupling member in an axial direction for coupling purposes, a shut off valve disposed in the first coupling member, said valve including a valve seating, a valve closure member controllable by the second coupling member and means for resiliently pressing the valve closure member against the seating, a plurality of locking means for preventing the valve closure member from being lifted off its seating, resilient means for retaining each locking means in its locking position independently of the others, and means on the second coupling member for directly releasing the locking means during the coupling operation.

2. A releasable coupling comprising a first coupling member, a second coupling member adapted to be pushed within the first coupling member in an axial direction for coupling purposes, a housing forming part of the first coupling member, a guide sleeve rigidly attached to the housing, a shut off valve disposed in the first coupling member, said valve including a valve seating, a valve closure member controllable by the second coupling member and means for resiliently pressing the valve closure member against the seating, a forwardly projecting member constrained to move with the valve closure member, a plurality of locking means for preventing the valve closure member from being lifted off its seating, said locking means being mounted in the forwardly projecting member and engaging in their locking position a shoulder on the guide sleeve, spring means for retaining each locking means in its locking position independently of the others and a projecting central tube on the second coupling member guided by the guide sleeve during coupling, the projecting central tube acting to displace the locking means from the shoulder on the guide sleeve on inward movement of the tube, further inward movement of the tube causing lifting of the valve closure member from its seating.

3. A releasable coupling comprising a first coupling member, a second coupling member adapted to be pushed within the first coupling member in an axial direction for coupling purposes, a housing forming part of the first coupling member, a guide sleeve rigidly attached to the housing, a shut off valve disposed in the first coupling member, said valve including a valve seating, a valve closure member controllable by the second coupling member and means for resiliently pressing the valve closure member against the seating, a central ring rigidly secured to the valve closure member, a plurality of locking means mounted in said ring for preventing the valve closure member from being lifted off its seating, and engaging in their locking position a shoulder on the guide sleeve, spring means also mounted in said ring for retaining each locking means in its locking position independently of the others, and a projecting central tube on the second coupling member guided by the guide sleeve during coupling, the projecting central tube acting to displace the locking means from the shoulder on the guide sleeve on inward movement of the tube, further inward movement of the tube causing lifting of the valve closure member from its seating.

4. A releasable coupling comprising a first coupling member, a second coupling member adapted to be pushed within the first coupling member in an axial direction for coupling purposes, a housing forming part of the first coupling member, a guide sleeve rigidly attached to the housing, a shut off valve disposed in the first coupling member, said valve including a valve seating, a valve closure member controllable by the second coupling member and means for resiliently pressing the valve closure member against the seating, a central ring rigidly secured to the valve closure member and having a plurality of radial apertures therein arranged with equal peripheral spacing, a plurality of locking means mounted in the apertures in the said ring and guided thereby for preventing the valve closure member from being lifted off its seating, and engaging in their locking position a shoulder on the guide sleeve, an equilateral polygonal spring surrounded by said ring, each side of said spring cooperating with one of said locking means to displace it radially relative to the ring and to retain it in its locking position independently of the others, and a projecting central tube on the second coupling member guided by the guide sleeve during coupling, the projecting central tube acting to displace the locking means from the shoulder on the guide sleeve on inward movement of the tube, further inward movement of the tube causing lifting of the valve closure member from its seating.

5. A releasable coupling comprising a first coupling member, a second coupling member adapted to be pushed within the first coupling member in an axial direction for coupling purposes, a housing forming part of the first coupling member, a guide sleeve rigidly attached to the housing, a shut off valve disposed in the first coupling member, said valve including a valve seating disposed on said guide sleeve, a valve closure member controllable by the second coupling member and means for resiliently pressing the valve closure member against the seating, a forwardly projecting member constrained to move with the valve closure member and guided in said guide sleeve, a plurality of locking means for preventing the valve closure member from being lifted off its seating, said locking means being mounted in the forwardly projecting member and engaging in their locking position a shoulder on the guide sleeve, spring means for retaining each locking means in its locking position independently of the others and a projecting central tube on the second coupling member guided by the guide sleeve during coupling, the projecting central tube acting to displace the locking means from the shoulder on the guide sleeve on inward movement of the tube, further inward movement of the tube causing lifting of the valve closure member from its seating.

6. A releasable coupling comprising a first coupling member, a second coupling member adapted to be pushed within the first coupling member in an axial direction for coupling purposes, a housing forming part of the first coupling member, a guide sleeve rigidly attached to the housing, a ring of elastomeric material arranged on the inner side of the guide sleeve, a shut off valve disposed in the first coupling member, said valve including a valve seating disposed on said guide sleeve, a valve closure member controllable by the second coupling member and means for resiliently pressing the valve closure member against the seating, a forwardly projecting member constrained to move with the valve closure member, and guided in said guide sleeve, a plurality of locking means for preventing the valve closure member from being lifted off its seating, said locking means being mounted in the forwardly projecting member and engaging in their locking position a shoulder on the guide sleeve, spring means for retaining each locking means in its locking position independently of the others and a projecting central tube on the second coupling member guided by the guide sleeve during coupling, the projecting central tube acting to displace the locking means from the shoulder on the guide sleeve on inward movement of the tube, further inward movement of the tube causing lifting of the valve closure member from its seating, the projecting tube having at least one annular groove on its outer side to cooperate with said ring of elastomeric material to provide a snap action retention of the second coupling member.

7. A releasable coupling comprising a first coupling member, a second coupling member adapted to be pushed within the first coupling member in an axial direction for coupling purposes, a housing forming part of the first coupling member, a guide sleeve rigidly attached to the housing, a ring of elastomeric material arranged on the inner side of the guide sleeve, a shut off valve disposed in the first coupling member, said valve including a valve seating disposed on said guide sleeve, a valve closure member controllable by the second coupling member and means for resiliently pressing the closure member against the seating, a forwardly projecting member constrained to move with the valve closure member, and guided in said guide sleeve, a plurality of locking means for preventing the valve closure member from being lifted off its seating, said locking means being mounted in the forwardly projecting member and engaging in their locking position a shoulder on the guide sleeve, spring means for retaining each locking means in its locking position independently of the others and a projecting central tube on the second coupling member guided by the guide sleeve during coupling, the projecting central tube acting to displace the locking means from the shoulder on the guide sleeve on inward movement of the tube, further inward movement of the tube causing lifting of the valve closure member from its seating, the projecting tube having two spaced annular grooves in its outer side to cooperate with said ring of elastomeric material to provide a snap action retention of the second coupling member, one groove being used when the coupling is fully coupled and the other when the projecting tube is disengaged from the locking means.

No references cited.